United States Patent
Labataille et al.

(10) Patent No.: US 8,585,012 B2
(45) Date of Patent: Nov. 19, 2013

(54) METHOD FOR CONTROLLING AN ACTUATOR

(75) Inventors: Joseph F. Labataille, Royal Oak, MI (US); Robert Keefover, Lake Orion, MI (US); Matthew E. Junker, Cadillac, MI (US)

(73) Assignee: BorgWarner Inc., Auburn Hills, MI (US)

( * ) Notice: Subject to any disclaimer, the term of this patent is extended or adjusted under 35 U.S.C. 154(b) by 459 days.

(21) Appl. No.: 12/988,813

(22) PCT Filed: Apr. 1, 2009

(86) PCT No.: PCT/US2009/039134
§ 371 (c)(1),
(2), (4) Date: Jan. 17, 2011

(87) PCT Pub. No.: WO2009/131811
PCT Pub. Date: Oct. 29, 2009

(65) Prior Publication Data
US 2011/0260083 A1 Oct. 27, 2011

Related U.S. Application Data

(60) Provisional application No. 61/046,885, filed on Apr. 22, 2008.

(51) Int. Cl.
*F15B 13/12* (2006.01)
*G05B 11/01* (2006.01)
*F16K 31/02* (2006.01)

(52) U.S. Cl.
USPC ............... 251/129.04; 251/129.12; 318/560; 318/599

(58) Field of Classification Search
USPC ................ 251/129.04, 129.12; 318/560, 599
See application file for complete search history.

(56) References Cited

U.S. PATENT DOCUMENTS

| | | | |
|---|---|---|---|
| 4,649,803 A | 3/1987 | Abel | |
| 4,761,608 A * | 8/1988 | Franklin et al. | 324/202 |
| 5,157,956 A * | 10/1992 | Isaji et al. | 73/1.75 |
| 5,431,086 A | 7/1995 | Morita et al. | |
| 5,682,922 A | 11/1997 | Galazin et al. | |
| 7,064,508 B2 * | 6/2006 | Keefover et al. | 318/434 |

(Continued)

FOREIGN PATENT DOCUMENTS

| | | |
|---|---|---|
| CN | 1890459 A | 1/2007 |
| JP | S62-193530 A | 8/1987 |

(Continued)

OTHER PUBLICATIONS

Chinese Office Action and Search Report dated Jan. 14, 2013; Application No. 200980112990.5: Applicant: BorgWarnerInc.; 11 pages.

(Continued)

*Primary Examiner* — John Rivell
(74) *Attorney, Agent, or Firm* — BrooksGroup

(57) ABSTRACT

A method for controlling an actuator, such as the type used to drive valves, vanes, and other variable position devices. In one exemplary embodiment, a method may improve the accuracy of actuator feedback by periodically or dynamically resetting the position of a lower hard stop, which can then be used as a future point of reference.

30 Claims, 7 Drawing Sheets

(56) References Cited

U.S. PATENT DOCUMENTS

| | | | |
|---|---|---|---|
| 7,855,525 B2 * | 12/2010 | Sanders et al. | 318/466 |
| 8,086,329 B2 * | 12/2011 | Keefover et al. | 700/47 |
| 8,190,297 B2 * | 5/2012 | Gunnarsson et al. | 700/282 |
| 2005/0080495 A1 * | 4/2005 | Tessier et al. | 700/63 |

FOREIGN PATENT DOCUMENTS

| | | |
|---|---|---|
| JP | H03-057853 | 3/1991 |
| JP | H07-217760 A | 8/1995 |
| JP | H07-331723 A | 12/1995 |
| JP | H09-298898 A | 11/1997 |
| JP | 09-317570 | 12/1997 |
| JP | 11-280526 A | 10/1999 |
| JP | 2001099347 A | 4/2001 |
| JP | 2011-207876 A | 8/2001 |
| JP | 2004150400 A | 5/2004 |
| JP | 2008-019957 A | 1/2008 |

OTHER PUBLICATIONS

Japanese Office Action dated Jun. 4, 2013; Application No. 2011-506336; Applicant BorgWarner Inc.; 10 pages.

* cited by examiner

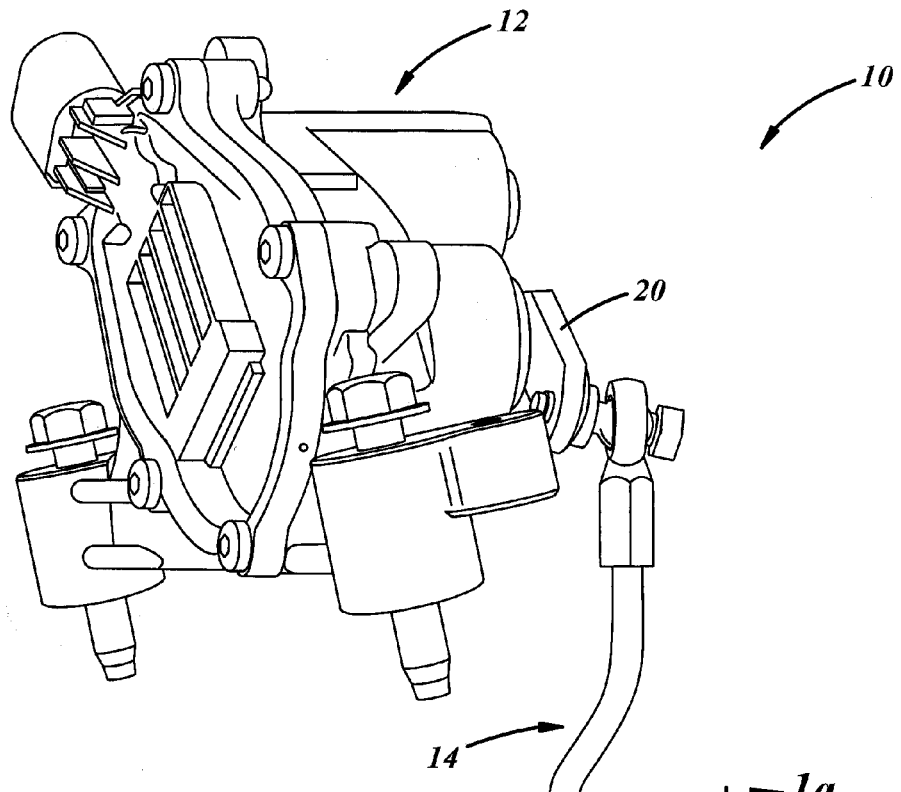
FIG. 1
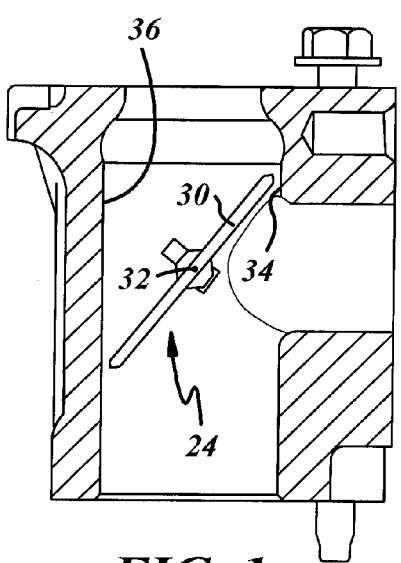
FIG. 1a
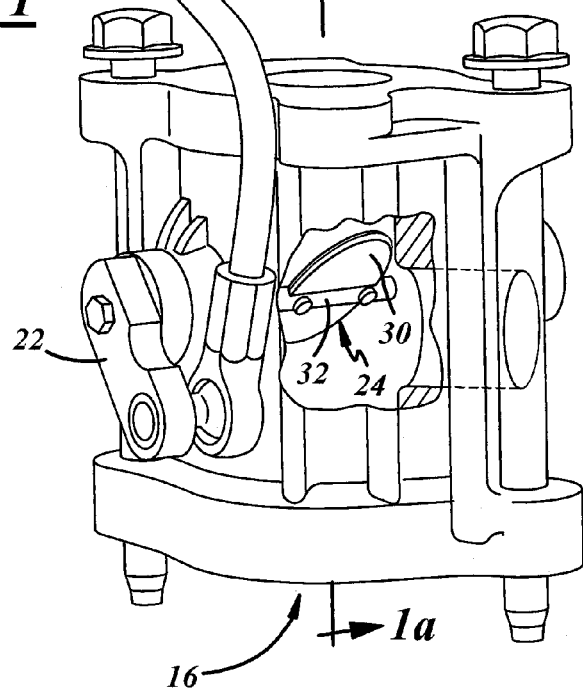

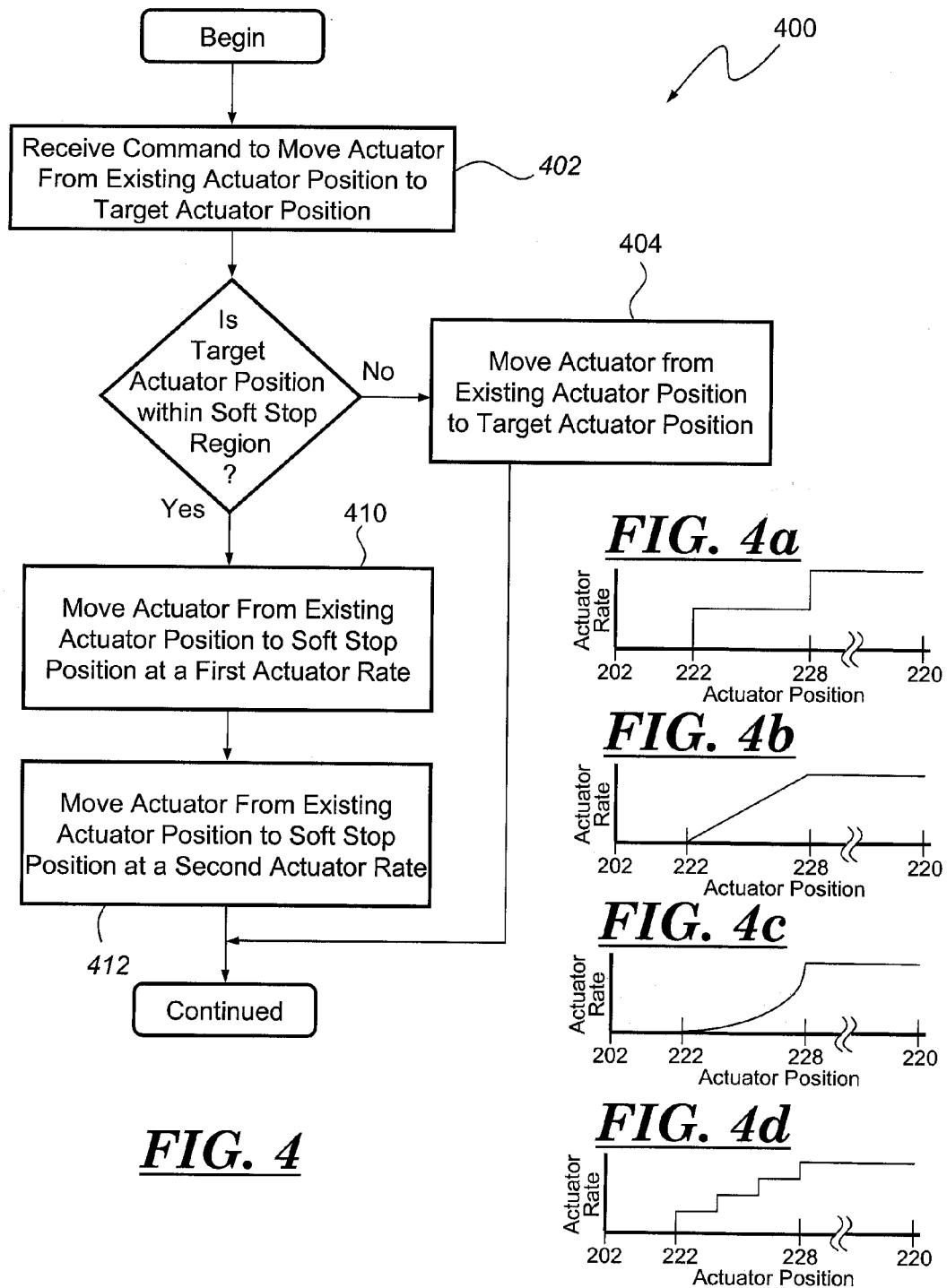

METHOD FOR CONTROLLING AN ACTUATOR

This application claims the benefit of U.S. Provisional Application No. 61/046,885 filed Apr. 22, 2008 and PCT Application Serial No. US09/39134 filed Apr. 1, 2009.

TECHNICAL FIELD

The field to which the disclosure generally relates includes actuators, such as actuators commonly used to operate valves, vanes, and other types of variable position devices.

BACKGROUND

Actuators can be used to control the position of valves, vanes, and other types of variable position devices that regulate the flow of fluids, for example.

SUMMARY OF EXEMPLARY EMBODIMENTS OF THE INVENTION

One exemplary embodiment may include a method for controlling an actuator, comprising: (a) driving the actuator so that a variable position device moves towards a hard stop; (b) determining if a collision takes place between the variable position device and the hard stop; and (c) if a collision takes place between the variable position device and the hard stop, then determining a current actuator position and resetting a hard stop position with the current actuator position.

Another exemplary embodiment may include a method for controlling an actuator, comprising: (a) driving the actuator so that a variable position device moves towards a hard stop; (b) monitoring the power supplied to the actuator to sense a collision between the variable position device and the hard stop; and (c) if a collision takes place between the variable position device and the hard stop, then establishing a new hard stop position that can be used as a future point of reference.

Another exemplary embodiment may include a method for controlling an actuator, comprising: (a) obtaining a first lower hard stop position; (b) using the first lower hard stop position as a point of reference when driving the actuator; (c) determining if a collision takes place between a valve and a lower hard stop; (d) if a collision takes place between the valve and the lower hard stop, then obtaining a second lower hard stop position; (e) updating the first lower hard stop position with the second lower hard stop position; and (f) using the second lower hard stop position as a point of reference when driving the actuator.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 1 is a perspective view of a bypass valve assembly according to one exemplary embodiment;

FIG. 1a is a section view of an exemplary butterfly valve that is part of the bypass valve assembly of FIG. 1, wherein the section is taken along the lines 1a-1a in FIG. 1;

FIGS. 4a-4d are graphs illustrating exemplary actuator rates that can be used within a soft stop region;

DETAILED DESCRIPTION OF EXEMPLARY EMBODIMENTS

Figure 2:
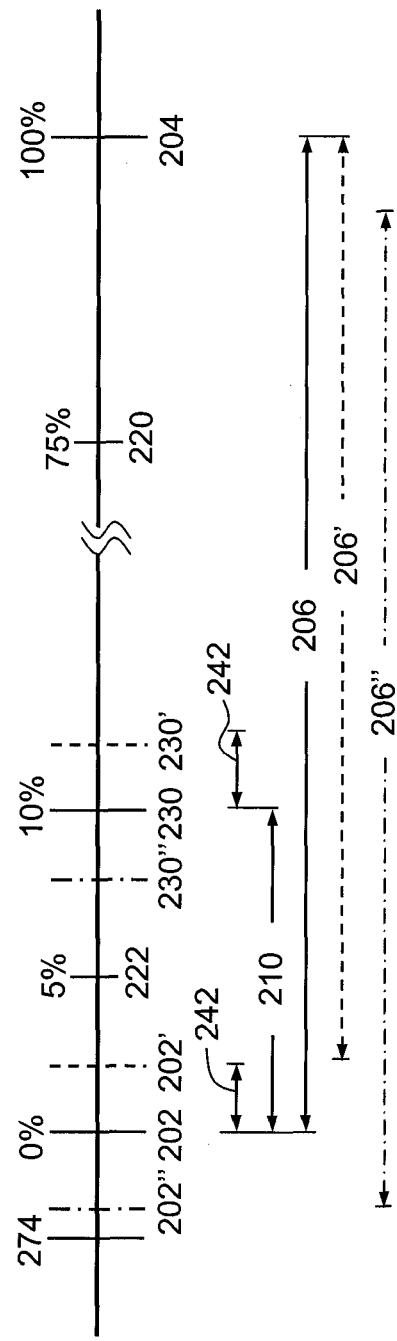
FIG. 2 is a linear graph depicting the mechanical travel of an exemplary actuator that could be used with the bypass valve assembly of FIG. 1.

The following description of the embodiment(s) is merely exemplary (illustrative) in nature and is in no way intended to limit the invention, its application, or uses.

Variable position devices such as valves, vanes, etc. can be controlled by actuators using closed-loop feedback. It is usually desirable that the feedback, such as that pertaining to the position of the device, be accurate and precise. The desire for precise position feedback is particularly acute for adjustable devices, like modulated valves, that can be moved between a number of discrete positions; not merely on and off states. For example, if an actuator attempts to drive a modulated valve to a partially closed position, knowing the precise position of the valve during operation can be beneficial for avoiding unintended collisions with cooperating components, for precisely metering or controlling fluid flow through the partially closed valve, and for other purposes appreciated by those skilled in the art.

The challenges associated with precise position control are sometimes exacerbated by factors such as thermal expansion and contraction, the wearing down of component surfaces, as well as other factors that cause the size and/or position of a component to change. These types of factors can be especially prevalent in a vehicle engine where components are subjected to a wide range of operating temperatures and harsh operating conditions. Although the control method described herein is provided in the context of an exemplary bypass valve assembly for a vehicle engine, it should be appreciated that the control method could be used with one of a number of other applications, including both vehicle and non-vehicle applications. Some examples of other suitable vehicle applications include exhaust gas recirculation (EGR) and wastegate valves for the engine, as well as variable geometry turbo charger vanes, to name but a few.

With reference to FIGS. 1 and 1a, there is shown an exemplary bypass valve assembly 10 that may be utilized in a variety of exemplary method embodiments, and may include an actuator unit 12, a linkage 14, and a valve unit 16. Actuator unit 12 generally provides the mechanical output that operates valve unit 16 and, according to this embodiment, includes an electric actuator, a governor, and an internal position sensor (none of which are shown). The electric actuator can be any type of suitable actuator means familiar to skilled artisans including, for example, brushless motors. The governor may be an electronic controller and includes position control logic and other resources needed to execute incoming command messages and control the electric actuator accordingly. The internal position sensor determines the position of the electric actuator within actuator unit 12 and can be implemented as one of a variety of known sensing devices. It is also possible for actuator unit 12 to be by powered by hydraulic, pneumatic, or other means known in the art.

In this particular embodiment, mechanical output is transferred from actuator unit 12 to linkage 14 via output arm 20, and from linkage 14 to valve unit 16 via input arm 22. Of course, other linkage arrangements and configurations could be used instead. Valve unit 16 generally controls the flow of fluid therethrough and can include one of a variety of different valve mechanisms, including the exemplary butterfly valve 24 shown here. Input arm 22 is operably connected to valve 24 and can control the position or operating state of the valve by rotating a valve flap 30 about a valve axis 32, as is appreciated by skilled artisans.

In operation, an engine control unit (ECU) or other electronic device sends a command message to actuator unit 12. That command message, which can be in the form of a controller area network (CAN) message or the like, typically includes a target position for the electric actuator. The governor processes the command message with the target position and generates a setpoint position, which is generally an internal target position used to control the electric actuator. People skilled in the art will appreciate that for reasons related to internal logic, etc., the setpoint position can sometimes vary from the target position; this will be subsequently explained in more detail, particularly, in connection with the soft stop procedure. As the electric actuator moves to the setpoint position, mechanical output is generated by actuator unit 12 and is transferred to valve unit 16 via linkage 14, as already explained.

The mechanical output drives valve 24 through a range of motion that can extend from a fully closed position to a fully opened position (a partially closed position is shown in FIG. 1a). When valve 24 is in the fully closed position, valve flap 30 contacts a lower hard stop 34 which physically restricts the valve from further movement in the closed direction. Likewise, an upper hard stop 36 corresponds to a fully opened position and prohibits valve 24 from opening further beyond this point. Hard stops can be provided in a variety of forms and can include embodiments other than the exemplary seating surfaces 34, 36 shown in FIG. 1a. For instance, a hard stop could include a motion limiting stop or other component that dictates the range of motion of actuator unit 12, linkage 14, and/or valve unit 16.

As previously mentioned, actuator unit 12 includes an internal position sensor that can provide electronic feedback regarding the position of the electric actuator and, hence, valve 24 (the valve position can be calculated as a function of the actuator position). However, the actual and calculated positions of the valve can vary. Because actuator unit 12 and valve unit 16 are separated by the length of linkage 14 they could be subjected to different thermal environments, which in turn could affect the degree of thermal growth experienced by their components. If the components of actuator unit 12 are closer to the engine exhaust, for example, they may expand at a greater rate than those of valve unit 16. In this scenario, calculating the position of valve 24 based on the sensed position of the electric actuator can result in a small error or offset. This error can be further increased by factors such as lash or slop in the system.

The accuracy of the actuator feedback may be improved by periodically or dynamically resetting the position of the lower hard stop, which can then be used as a future point of reference. According to the embodiment shown in FIG. 1a, when valve flap 30 contacts lower hard stop 34, the current position of the actuator may be determined and the lower hard stop position may be recalibrated with the current actuator position. By periodically resetting the location of the lower hard stop, valve 24 or any other variable position device, may be operated more precisely in positions near lower hard stop 34. This resetting or recalibration technique may be used in conjunction with other procedures and features, including those described herein.

Figure 3:
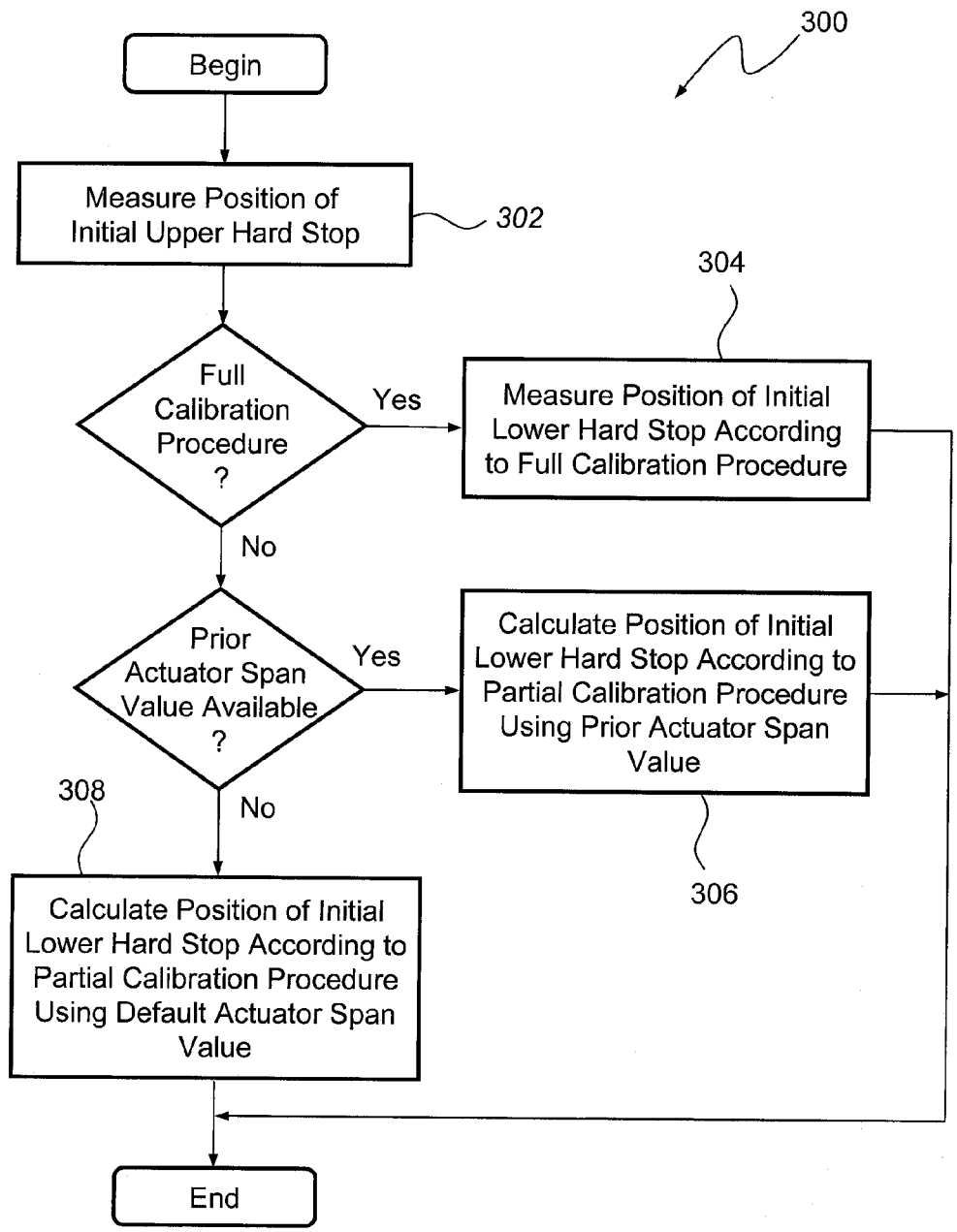
FIG. 3 is a flowchart illustrating at least portions of a method for implementing an initial calibration procedure, according to one exemplary embodiment.

Turning now to FIGS. 2 and 3, a depiction of an actuator path and a flowchart are shown, respectively, which illustrate an embodiment 300 of a method for controlling an electric actuator. The particular embodiment shown here includes an 'initial calibration procedure' that determines lower and upper hard stop positions 202, 204, each of which is generally used by the method until another hard stop position is subsequently determined. The initial calibration procedure is oftentimes executed when the actuator is initially powered up or turned on. For purposes of clarity and illustration, the following description does not make a distinction between actual hard stops that physically restrict the movement of the actuator, and electronic hard stops that electronically restrict the actuator movement in order to provide for tolerances, etc. For example, in FIG. 2 an electronic hard stop could be positioned just to the right of lower hard stop 202, and an electronic hard stop could be located just to the left of upper hard stop 204. Thus, the term 'hard stop' broadly refers to any type of feature, whether it be located in the valve unit or otherwise, that physically restricts an actuator range of motion or electronically restricts and actuator range of motion in view of a physical hard stop.

Beginning with step 302, the actuator drives valve 24 in the open direction until valve flap 30 contacts upper hard stop 36, at which point the current actuator position is measured and stored as upper hard stop position 204. The upper hard stop position is generally representative of the furthest point to which the actuator can travel in the open direction, at which point the actuator is physically restricted from further movement. According to this particular embodiment, the upper hard stop position 204 remains constant and does not change unless another initial calibration procedure is executed; however, other embodiments where the upper hard stop position is periodically determined or changed could also be used.

The initial calibration procedure next determines lower hard stop position 202, and this can be performed in one of several different ways. For instance, if a 'full calibration procedure' is being performed, then the actuator is driven to the opposite end of its range of motion until valve flap 30 physically contacts lower hard stop 34, at which point the lower hard stop position 202 is measured, step 304. A variety of techniques can be used to sense contact between the valve and the lower hard stop, including those subsequently described.

If a 'partial calibration procedure' is executed, then the control method calculates the lower hard stop position 202 instead of directly measuring it. The actuator span 206 is generally representative of the maximum travel of the actuator, whether it be linear, rotational, etc., and generally extends from the lower hard stop position 202 to the upper hard stop position 204. The actuator span can be provided in terms of increments, such as length increments, degree increments, Hall Effect Device (HED) increments, or some other increments known to those skilled in the art. Actuator positions are described below in percentage terms of the actuator span; e.g., lower hard stop position (0%), upper hard stop position (100%), etc. According to the embodiment of FIG. 3, the control method checks to see if an actuator span value was determined in a previous procedure; i.e., a prior actuator span value. If a prior actuator span value was previously determined, then step 306 retrieves this information from an electronic memory and calculates the lower hard stop position 202 by using the upper hard stop position 204 and the prior actuator span value.

If a prior actuator span value is not available, then step 308 can use a default actuator span value and calculate the lower hard stop position 202 accordingly. As an example, an end-of-line (EOL) value could be used for a default actuator span value. The EOL value corresponds to a predetermined range of motion that is specific to that particular actuator implementation and can be provided by the actuator manufacturer, for example.

In each of the preceding examples, the upper hard stop position 204 is physically measured and, depending on the circumstances, the lower hard stop position 202 is either physically measured (step 304) or is calculated (steps 306, 308) using the upper hard stop position and an actuator span value. The lower hard stop position 202 can be used until a subsequent collision takes place with the lower hard stop, at which point a newly measured or revised lower hard stop position is determined. By periodically resetting or updating the position of the lower hard stop, the control method is able to provide a more accurate and current account of that position. This can improve the accuracy of the actuator feedback, particularly in environments where the hard stop positions drift over time due to thermal growth or other phenomenon.

Figure 4:
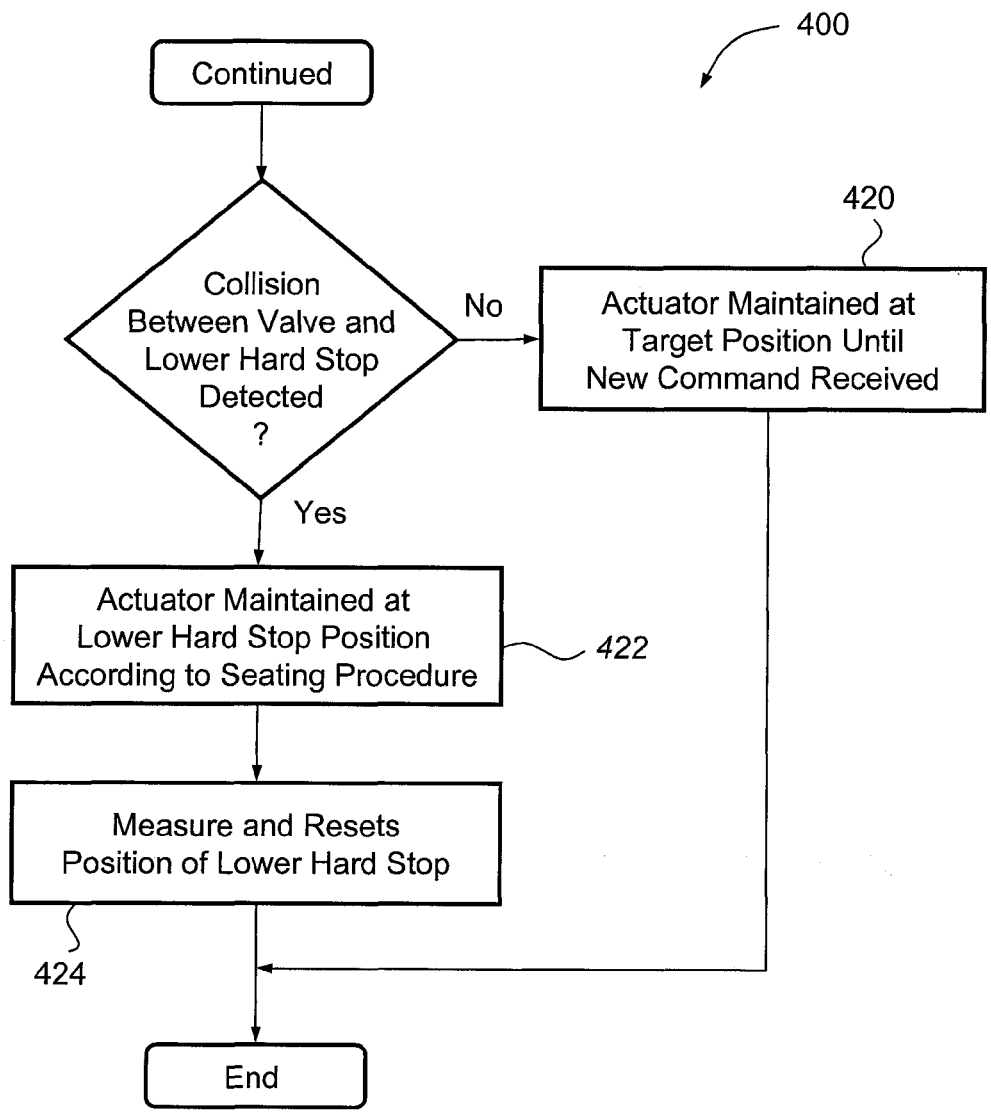
FIG. 4 is a flowchart illustrating at least portions of a method for implementing a soft stop procedure, according to one exemplary embodiment.

FIGS. 2 and 4 illustrate a different embodiment 400 of a method for controlling the actuator. This method employs a 'soft stop procedure' that generally drives the actuator at a slower actuator rate when the actuator is in a soft stop region to avoid high speed collisions between the valve 24 and hard stops 34, 36. By avoiding such collisions, soft stop region 210 can reduce the potential damage to the components of actuator unit 12, linkage 14, valve unit 16, and/or other devices. The following description is directed to a soft stop region used with a lower hard stop, however, it should be appreciated that similar soft stop regions can be used with upper hard stops as well.

In this exemplary embodiment, control method 400 moves the actuator from an existing position 220 (e.g., 75%) to a target position 222 (e.g., 5%), which is inside soft stop region 210. As demonstrated in FIG. 2, soft stop region 210 extends from lower hard stop 202 (e.g., 0%) to a soft stop position 230 (e.g., 10%). The length of soft stop region 210 can be determined as a percentage of the overall actuator span. For example, in this particular embodiment, soft stop region 210 is 10% of actuator span 206. Alternatively, the length of soft stop region 210 could be a fixed value or a value based on some other non-percentage-based method, for example.

Beginning with step 402, the control method receives a command message to move from the existing position 220 to the target position 222. If the target position 222 is not within soft stop region 210, then the setpoint position is simply the target position and the actuator is moved to the target position according to one of a number of techniques known in the art, step 404. If, however, target position 222 is within soft stop region 210—as it is in this example—then the actuator first moves from existing position 220 to soft stop position 230 at a first actuator rate, step 410, and then moves from soft stop position 230 to target position 222 at a second slower actuator rate, step 412. In the this scenario, the setpoint position (i.e., the internal target position used by the actuator governor) is first set to the soft stop position 230 and, once the actuator reaches the soft stop position, is then set to target position 222.

With reference to FIGS. 4a-d, there are several examples of slower actuator rates that could be used in step 412, including a constant rate (FIG. 4a) and changing rates (FIGS. 4b-d). In FIG. 4b, the second actuator rate—i.e., the rate at which the actuator is moved while in the soft stop region—linearly declines until the actuator reaches the target actuator position 222; in FIG. 4c, the second actuator rate exponentially declines; and in FIG. 4d the second actuator rate declines according to a stepped function. It should be recognized that these rate functions are only provided for purposes of illustration and that other rate functions, including ones that are modifiable, could also be used so long as they are generally slower than the actuator rate in step 410.

If no collision between the actuator and lower hard stop is detected, then the actuator will remain at the target position 222, step 420, until a new command is received or some other action is taken. Various collision detecting techniques could be used including, but not limited to, those subsequently described. Because the soft stop procedure is generally designed to minimize the effects of collisions with the hard stops, it is possible to disable the soft stop procedure in certain circumstances. For instance, the soft stop procedure could be disabled when the actuator is moving away from a hard stop.

Now, consider an example where the target position is the lower hard stop position 202 (0%) instead of target position 222 (5%). The actuator is driven until valve 24, or some other variable position device, contacts lower hard stop 34. Following detection of a collision, step 422 continues driving the actuator in a closed direction so that the valve is firmly pressed against the lower hard stop. This procedure, which is referred to here as a 'seating procedure', can improve the seal between the valve and hard stop by driving the valve against the hard stop in a relatively constant manner.

In one exemplary embodiment, in order to avoid burning out the electric actuator, a 'power limiting mode' can be initiated when the actuator enters soft stop region 210 and is headed towards lower hard stop position 202. This way, if the lower hard stop is encountered, the actuator can continue exerting a seating force against the hard stop, but do so in a manner that does not damage the electric motor. According to one embodiment of the power limiting mode, the seating duty cycle is ramped or otherwise increased after the valve contacts the hard stop. This increase continues until it reaches a maximum seating duty cycle or the current exceeds a maximum seating current, whichever comes first. It is anticipated that the maximum seating current will clip or otherwise restrain increases in the duty cycle and will maintain the seating duty cycle at a level that is lower than its maximum.

Once a collision is detected, step 424 determines and resets or recalibrates the position of the lower hard stop. By resetting the lower hard stop position each time a collision occurs, the present control method can improve the accuracy of the actuator feedback. This can be beneficial, particularly in environments where the hard stop positions dynamically change due to factors like thermal growth, etc.

It should be appreciated that there are different ways in which the hard stop positions could be reset. For example, the lower hard stop position 202 could be reset by simply saving a new position over an old position. Alternatively, the lower hard stop position 202 could be reset through the use of different mathematical techniques, including first order filters based on last known values. For example, a look-up table and the two lower hard stop positions (i.e., the new position value and the old position value) may be used to derive an increment by which the old or previously measured value could be adjusted. This type of technique can smooth out or mitigate the effects of errant readings.

Figure 5:
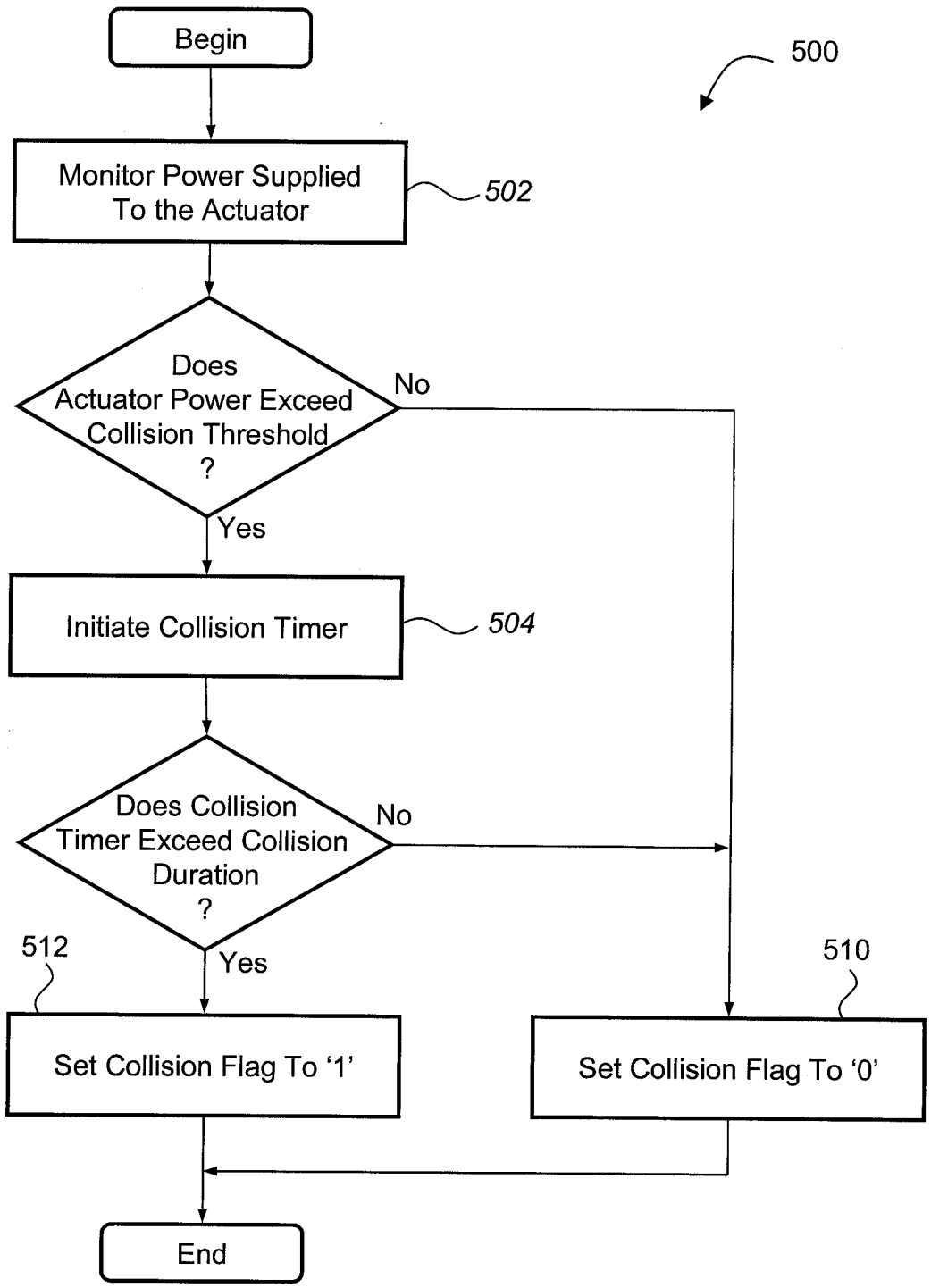
FIG. 5 is a flowchart illustrating at least portions of a method for implementing a collision detection procedure, according to one exemplary embodiment.

Referring now to FIG. 5, there is shown another embodiment 500 of a method for controlling an actuator. One exemplary embodiment may be directed to a 'collision detection procedure' that generally monitors the power supplied to the actuator to determine if a collision takes place with a hard stop. It should be appreciated that while the following description is directed to a collision detection procedure being performed within a soft stop region 210, it is possible to use these collision detection features outside of a soft stop region. Beginning with step 502, the method monitors the amount of power supplied to the actuator. In the case of an electric actuator, the current and/or voltage provided to the actuator could be observed; in the cases of hydraulic or pneumatic actuators, other variables representative of actuator power could be monitored. When lower hard stop 34 is physically confronted by valve 24, the power supplied to the actuator is expected to rise.

Therefore, one exemplary embodiment compares the sensed actuator power to a collision threshold. If the sensed actuator power meets or exceeds the collision threshold, then a collision timer is initiated in step 504. If the sensed power does not exceed the collision threshold, then it is assumed that a collision has not taken place and a collision flag is set to '0', step 510. Momentary surges in actuator power can sometimes occur without there being physical contact with a hard stop. Thus, method 500 may further require that the actuator power exceed the collision threshold for a certain amount of time (referred to as the collision duration) before determining that a collision has occurred. If the collision timer does not exceed the collision duration, it will again be assumed that no collision has occurred and the collision flag will be set to '0'. If, on the other hand, the power supplied to the actuator exceeds the collision threshold for an amount of time greater than the collision duration, the present method will assume that a collision with a hard stop has occurred and the collision flag will be set to '1', step 512.

In one exemplary embodiment, the collision threshold is between 0.5 watts –10 watts, inclusive, and the collision duration is between 10 ms-1 s, inclusive. Use of these parameters can prevent temporary blips in actuator power from being misinterpreted as hard stop collisions. The preceding steps, particularly the sampling of actuator power, should be executed at a sufficiently high frequency so that momentary reductions in actuator power that fall below the collision threshold can be detected. In such an event, the collision timer is stopped. If the reduction in actuator power is only temporary—i.e., the actuator power resumes to an elevated level above the collision threshold—then the collision timer can be reset and started over.

Figure 6:
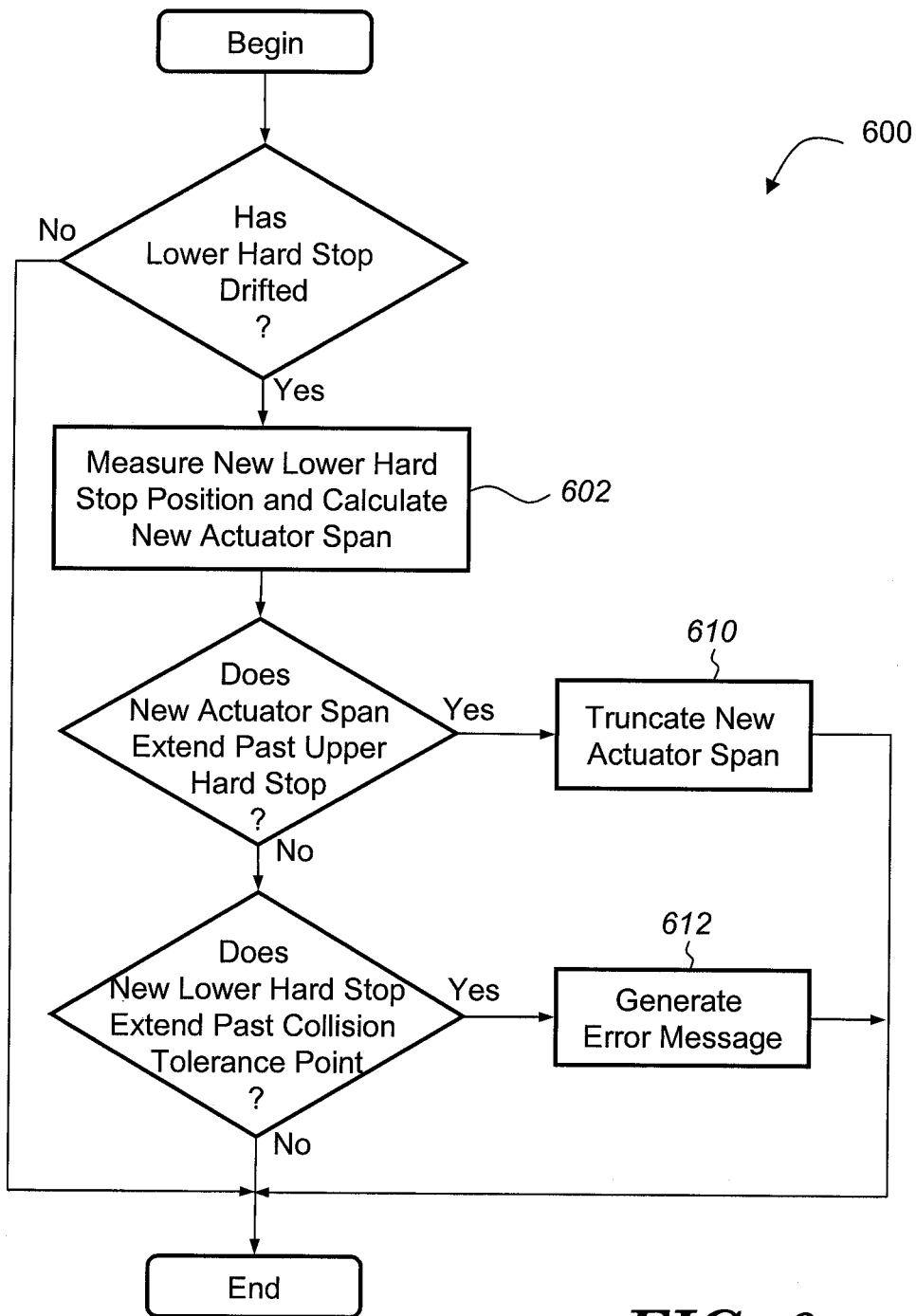
FIG. 6 is a flowchart illustrating at least portions of a method for implementing a hard stop drifting procedure, according to one exemplary embodiment.

In FIG. 6 there is shown another embodiment 600; namely, an embodiment that uses a 'hard stop drifting procedure' to account for changes in the positions of the hard stops. As an example, method 600 can be used to account for movement of lower hard stop 34 due to thermal growth or other forces—a phenomenon sometimes referred to as drifting or creeping—when the valve 24 is seated against it. The following description discusses two exemplary drifting situations: a first situation where the lower hard stop drifts upwards towards the upper hard stop, and a second situation where the lower hard stop drifts downwards away from the upper hard stop.

In the first example, the actuator is seated at lower hard stop position 202 when the lower hard stop drifts upwards to a new lower hard stop position 202' (new actuator positions shown in broken lines). The amount of drift experienced by the hard stop is illustrated as the distance 242, which in this example is approximately 2%. Step 602 measures the new lower hard stop position 202' and calculates a new actuator span 206' based thereon. The new lower hard stop position 202' can simply be saved over the previous lower hard stop position, or step 602 can use techniques such as first order filters to establish it, as previously explained.

Because all of the actuator positions are based off of the lower hard stop position, the entire actuator span 206' and the soft stop position 230' shift with the new lower hard stop position 202'. It is not usually desirable for the actuator span to extend beyond the upper hard stop position 204. Therefore, the method checks to see if the newly shifted actuator span 206' extends beyond upper hard stop 204 and, if it does, the actuator span is truncated accordingly. As demonstrated in FIG. 2, actuator span 206' has been truncated or cut short so that it does not extend beyond upper hard stop position 204. This 'span limiting procedure' can be desirable in that it prevents the actuator from operating in a range of motion that is beyond its physical boundaries, yet truncates the span at an upper end where precision valve control is less important. Stated differently, most applications like valve 24 are less concerned about precisely controlling the valve in a fully opened position as they are about precisely controlling the valve in a fully closed position.

In situations where the shifted actuator span 206' does not exceed the upper hard stop position 204, there is no need to truncate the actuator span. In those cases, the shifted actuator span 206' and previous actuator span 206 would be of the same length.

Now consider the example where the lower hard stop drifts downwards, in the opposite direction, to a new lower hard stop position 202". Again, the method checks to make sure that the lower hard stop, and hence the new actuator span 206", is still within an acceptable range. If the new lower hard stop position 202" has extended beyond a collision tolerance point 274, then step 612 generates an error message and, depending on the application, can possible disable the actuator. If the actuator has shifted so much that the lower hard stop is beyond the collision tolerance point 274, it is oftentimes evidence of a mechanical actuator problem, such as broken gears or linkage members. If the lower hard stop position has not surpassed collision tolerance point 274—i.e., it is within an acceptable range of operation—then the new actuator positions calculated in step 602 can be used.

One or more of the methods and procedures described above could utilize an 'integrator reset' feature that resets an integration value in certain situations. For instance, if the governor employs an integrated pulse-width modulated (PWM) control, the integration factor can wind-up or increase when valve 24 is contacting one of the hard stops. If this occurs, the integrator reset feature can reset the integration factor to a predetermined or calibratable value.

The above description of embodiments of the invention is merely exemplary in nature and, thus, variations thereof are not to be regarded as a departure from the spirit and scope of the invention. Various combinations of the above-described methods, procedures, modes, features, etc. could be used together. It is possible to use the collision detection procedure with the soft stop procedure, or to use the seating procedure with the hard stop drifting procedure, or to use the collision detection procedure with the initial calibration procedure, to cite but a few examples. Moreover, the methods and procedures described above could employ a sequence or combination of steps that differs from the exemplary embodiments described. Although the embodiments described above largely relate to lower hard stops, they are also applicable to upper hard stops, as well as electronic hard stops, as previously explained.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method for controlling an actuator, comprising:
   (a) driving the actuator so that a variable position device moves towards a hard stop;
   (b) determining if a collision takes place between the variable position device and the hard stop; and
   (c) if a collision takes place between the variable position device and the hard stop, then determining a current actuator position and resetting a hard stop position with the current actuator position.

2. The method of claim 1, wherein (a), (b), and (c) are part of an initial calibration procedure that determines first and second hard stop positions, and each of the first and second hard stop positions is used by the method until another hard stop position is subsequently determined.

3. The method of claim 2, wherein the initial calibration procedure is a full calibration procedure that measures both the first and second hard stop positions.

4. The method of claim 2, wherein the initial calibration procedure is a partial calibration procedure that measures the second hard stop position and calculates the first hard stop position by using at least one actuator span value selected from the group consisting of: a prior actuator span value, or a default actuator span value.

5. The method of claim 1, wherein (a), (b), and (c) are part of a soft stop procedure that drives the actuator at a slower actuator rate when the actuator is within a soft stop region.

6. The method of claim 5, wherein the slower actuator rate includes at least one rate selected from the group consisting of: a constant rate, a linearly declining rate, an exponentially declining rate, or a stepped declining rate.

7. The method of claim 1, wherein (a), (b), and (c) are part of a seating procedure that continues to drive the actuator towards the hard stop after a collision takes place between the variable position device and the hard stop.

8. The method of claim 7, wherein the seating procedure utilizes a power limiting mode to increase a seating duty cycle of the actuator, and the seating duty cycle is increased until it exceeds a maximum seating duty cycle or an actuator current exceeds a maximum seating current, whichever comes first.

9. The method of claim 1, wherein (b) uses a collision detection procedure that monitors the actuator power to determine if a collision takes place between the variable position device and the hard stop.

10. The method of claim 9, wherein the collision detection procedure comprises: i) comparing the actuator power to a collision threshold, ii) initiating a timer if the actuator power meets or exceeds the collision threshold, and iii) stopping the timer if the actuator power falls below the collision threshold; wherein a collision takes place if the timer exceeds a collision duration.

11. The method of claim 1, wherein (a), (b), and (c) are part of a hard stop drifting procedure that accounts for changes in the position of a lower hard stop when the variable position device is seated against it.

12. The method of claim 11, wherein the hard stop drifting procedure truncates an actuator span if the actuator span extends beyond an upper hard stop.

13. The method of claim 12, wherein the hard stop drifting procedure generates an error message if the lower hard stop extends beyond a collision tolerance point.

14. The method of claim 11, wherein the hard stop drifting procedure employs integrated pulse-width modulated (PWM) control, and an integrator reset feature resets an integration factor when the variable position device is seated against the lower hard stop.

15. The method of claim 1, wherein the variable position device is a valve located in a vehicle engine and is selected from the group consisting of: a bypass valve, an exhaust gas recirculation (EGR) valve, or a wastegate valve.

16. A method for controlling an actuator, comprising:
    (a) driving the actuator so that a variable position device moves towards a hard stop;
    (b) monitoring the power supplied to the actuator to sense a collision between the variable position device and the hard stop; and
    (c) if a collision takes place between the variable position device and the hard stop, then establishing a new hard stop position that can be used as a future point of reference.

17. The method of claim 16, wherein (a), (b), and (c) are part of an initial calibration procedure that determines lower and upper hard stop positions, and each of the lower and upper hard stop positions is used by the method until another hard stop position is subsequently determined.

18. The method of claim 17, wherein the initial calibration procedure is a full calibration procedure that measures both the lower and upper hard stop positions.

19. The method of claim 17, wherein the initial calibration procedure is a partial calibration procedure that measures the upper hard stop position and calculates the lower hard stop position by using at least one actuator span value selected from the group consisting of: a prior actuator span value, or a default actuator span value.

20. The method of claim 16, wherein (a), (b), and (c) are part of a soft stop procedure that drives the actuator at a slower actuator rate when the actuator is within a soft stop region.

21. The method of claim 20, wherein the slower actuator rate includes at least one rate selected from the group consisting of: a constant rate, a linearly declining rate, an exponentially declining rate, or a stepped declining rate.

22. The method of claim 16, wherein (a), (b), and (c) are part of a seating procedure that continues to drive the actuator towards the hard stop after a collision takes place between the variable position device and the hard stop.

23. The method of claim 22, wherein the seating procedure utilizes a power limiting mode to increase a seating duty cycle of the actuator, and the seating duty cycle is increased until it exceeds a maximum seating duty cycle or an actuator current exceeds a maximum seating current, whichever comes first.

24. The method of claim 16, wherein (b) further includes monitoring the power supplied to the actuator by using a collision detection procedure comprising: i) comparing the actuator power to a collision threshold, ii) initiating a timer if the actuator power meets or exceeds the collision threshold, and iii) stopping the timer if the actuator power falls below the collision threshold;

wherein a collision takes place if the timer exceeds a collision duration.

25. The method of claim 16, wherein (a), (b), and (c) are part of a hard stop drifting procedure that accounts for changes in the position of a lower hard stop when the variable position device is seated against it.

26. The method of claim 25, wherein the hard stop drifting procedure truncates an actuator span if the actuator span extends beyond an upper hard stop.

27. The method of claim 25, wherein the hard stop drifting procedure generates an error message if the lower hard stop extends beyond a collision tolerance point.

28. The method of claim 25, wherein the hard stop drifting procedure employs integrated pulse-width modulated (PWM) control, and an integrator reset feature resets an integration factor when the variable position device is seated against the lower hard stop.

29. The method of claim 16, wherein the variable position device is a valve located in a vehicle engine and is selected from the group consisting of: a bypass valve, an exhaust gas recirculation (EGR) valve, or a wastegate valve.

30. A method for controlling an actuator, comprising:
(a) obtaining a first lower hard stop position;
(b) using the first lower hard stop position as a point of reference when driving the actuator in a first movement;
(c) determining if a collision takes place between a valve and a lower hard stop;
(d) if a collision takes place between the valve and the lower hard stop, then obtaining a second lower hard stop position;
(e) updating the first lower hard stop position with the second lower hard stop position; and
(f) using the second lower hard stop position as a point of reference when driving the actuator in a second movement.

* * * * *